(12) United States Patent
Gai

(10) Patent No.: US 10,801,160 B2
(45) Date of Patent: Oct. 13, 2020

(54) DRAW TAPE FOR CABLES OR SIMILAR FLEXIBLE ELEMENTS

(71) Applicant: Ultraflex S.p.A., Casella (GE), CA (US)

(72) Inventor: Marcella Gai, Casella (IT)

( * ) Notice: Subject to any disclaimer, the term of this patent is extended or adjusted under 35 U.S.C. 154(b) by 215 days.

(21) Appl. No.: 15/941,497

(22) Filed: Mar. 30, 2018

(65) Prior Publication Data

US 2018/0291555 A1   Oct. 11, 2018

(30) Foreign Application Priority Data

Apr. 6, 2017 (IT) .......................... 102017000037789

(51) Int. Cl.
*B63B 35/03* (2006.01)
*D07B 1/06* (2006.01)
*H02G 3/00* (2006.01)

(52) U.S. Cl.
CPC ........... *D07B 1/068* (2013.01); *D07B 1/0693* (2013.01); *H02G 3/00* (2013.01); *D07B 2201/1072* (2013.01); *D07B 2201/2023* (2013.01); *D07B 2201/2027* (2013.01); *D07B 2201/2087* (2013.01); *D07B 2201/2092* (2013.01); *D10B 2401/063* (2013.01)

(58) Field of Classification Search
USPC ..... 254/134.3 R; 29/505, 508, 510, 828, 872
See application file for complete search history.

(56) References Cited

U.S. PATENT DOCUMENTS

| | | | | |
|---|---|---|---|---|
| 5,640,766 A | * | 6/1997 | Fujino | H01B 13/0006 29/33 F |
| 7,197,809 B2 | * | 4/2007 | Gai | D07B 1/0693 29/508 |
| 2005/0205287 A1 | * | 9/2005 | Browning | H01B 5/105 174/102 R |
| 2010/0126986 A1 | * | 5/2010 | Gunzing | F16L 11/085 219/643 |
| 2015/0355430 A1 | * | 12/2015 | Clampitt | G02B 6/4432 385/103 |

FOREIGN PATENT DOCUMENTS

| | | |
|---|---|---|
| EP | 0414514 | 2/1991 |
| EP | 1553226 | 7/2005 |
| EP | 2574801 | 4/2013 |
| WO | 2006125693 | 11/2006 |

* cited by examiner

*Primary Examiner* — Joseph J Hail
*Assistant Examiner* — Shantese L McDonald
(74) *Attorney, Agent, or Firm* — Themis Law

(57) ABSTRACT

Draw tape for cables including an elongated flexible element made of a helical multifilament rope composed of three filaments or strands helically wound about a common longitudinal axis. According to an additional feature, the rope is hammered. Still according to an improvement, the rope is externally covered by a jacket.

19 Claims, 5 Drawing Sheets

DRAW TAPE FOR CABLES OR SIMILAR FLEXIBLE ELEMENTS

FIELD OF THE INVENTION

The present invention relates to a draw tape for cables or similar flexible elements.

BACKGROUND OF THE INVENTION

Draw tapes generally comprise an elongated flexible element with a predetermined length intended to transmit both pushing and pulling forces.

The draw tape serves for inserting one or more cables or other types of flexible longitudinal elements into passage ducts generally in the form of tubular elements.

In known draw tapes the cables or flexible elements are connected to a rear end of the draw tape flexible element generally in the form of a slot or ring where the ends of cables or further flexible elements are inserted which are then fastened to said slot by means of several types of clamping devices such as also by applying insulating tape or by mechanical elements removably securing the ends of the cables.

When inserting cables into tubular sheaths, for example in the building field where sheaths are corrugated and are firmly embedded in the masonry, the sheath often makes bends with a too small radius or material penetrates in the sheath. In this case the insertion of the draw tape is difficult and the draw tape, in order to pass through, has to exert a pushing action at the front end in order to overcome conditions where the front end gets stuck in the corrugated wall of the tubes or where the passage of the draw tape is hindered or is made difficult by the presence of obstacles in the tube.

A similar situation occurs even when inside a cable duct a considerable amount of cables has to pass through, which almost completely or substantially fill the section of the tube or of the passage. Such situation is quite frequent and it does not occur only when integrating an existing system where additional cables have to pass through sheaths or in tubes already filled by other cables.

In order to address possible problems, often the sheaths, especially chased sheaths, that is integrated or embedded in the masonry are selected with a greater section. However this involves installation problems since the masonry often has not such a thickness to contain the sheath or anyway the sheath is a considerable part of the thickness of the masonry that remains weakened thereby. However there are additional problems for the personnel during installation since a greater section sheath is more difficult to be modeled according to the selected path and moreover it has a higher resistance to deformation and a higher elastic return force.

SUMMARY OF THE INVENTION

An object of the present invention therefore is to provide a draw tape for cables whose flexible element is able to exert and transmit pushing and pulling forces higher than current draw tapes without for this reason being too much expensive.

A further object of the present invention is to provide a draw tape for cables that is robust and long lasting even under very extreme use conditions for the material such as for example conditions of building yards or similar yards.

Another object of the present invention is to make operations installing cables or the like more easy.

Still another object is to allow the passage ports of tubes or sheaths to be used as much as possible, without for this reason making cable installation as difficult.

Still another object is to allow sections of tubes or cable sheaths to be maintained small such to reduce material costs, and to make installation operations for sheaths more easy above all for chased sheaths, embedded in the masonry.

The invention achieves the above objects by providing a draw tape for cables or for elongated flexible elements, comprising a flexible body with a predetermined dimension which is composed of a helical multifilament rope composed of at least three filaments or strands helically wound about a common longitudinal axis, said rope being externally covered by a jacket.

According to one embodiment the external jacket of the rope is composed of intrinsically lubricating, or self-lubricating materials, such as for example Teflon.

The small number of strands, particularly the number of three filaments or strands guarantees many advantages. Several laboratory tests have shown how the reduced number of strands results in a smaller number of contact points of the rope with the elements it is in contact with. Thus the contact points, or better the helical areas in contact with the rope are limited as regards extension, and therefore generate a smaller friction force. It is clear that a helix with a small number of paddles has an accordingly small number of points of contact with the walls against which it slides.

A further characteristic of the rope of the present invention is that, in a preferred embodiment, said rope is assembled by hammering and accordingly by reducing the diameter of the rope as compared with the diameter thereof before hammering.

The rope so obtained may be advantageously used to transmit motion either by pulling or by pushing, thanks to the fact that the small number of strands, together with the fact that the rope is assembled by hammering, provides the rope with a good flexibility as well as an optimized behavior in both longitudinal directions of stress during pulling and/or pushing motion transmission, which makes it ideal to form the elongated flexible element of a draw tape.

The process hammering the rope provides the diameter of the rope to be reduced, due to the fact that the strands are deformed and squeezed against each other. Squeezing the strands together and deforming the section of the strands results in a rope having a stiffer behavior, so that, when it is subjected to a longitudinal pushing stress, the rope does not tend to open or to absorb a part of the stress, but it tends to transmit said pushing stress as if it were a rigid rod, while maintaining the flexibility required from ropes, a characteristic advantageous for operations passing cables in conditions with hindrances or obstacles for the passage of the draw tape in cable ducts.

According to a further characteristic that can be provided in combination with the previous characteristics, the rope can have four, five or more strands.

The strands can have a solid section or in turn they can be composed of multifilament cables.

According to one embodiment the rope according to one or more of the preceding characteristics is made as an amour cable, said rope being externally covered by a cylindrical jacket or an armor coating, preferably made of metal material.

One embodiment of said jacket or said armor external coating provides it to be composed of a strap with a substantially rectangular section helically wound about said rope.

According to a further characteristic said armor is made both by simply being wound about the rope and by winding it about the rope and then by hammering said strap or strip of material against the rope surface.

According still to another characteristic, a cover of the external armor jacket or of the armor coating is provided made of plastic material and which external covering layer has such a section that it adheres against the jacket or armor coating and externally it has one, preferably several longitudinal ribs radially projecting from the external surface and which are angularly arranged along the perimetric circular section and have a substantially rectilinear path parallel to the axis of the rope or a helical arrangement.

According to a further characteristic, the rope composing the elongated flexible element of the draw tape provides filaments or strands with a substantially circular section having the same diameter and where the respective centers of the circumferences of the outermost filaments or strands in the section of the rope are at the vertices of a regular polygon corresponding to the number of the outermost strands or filaments of the rope.

When the strands or filaments are three then the centers of the strands or filaments are at the vertices of an equilateral triangle, the center of gravity of such equilateral triangle corresponding to the longitudinal winding axis of the helicoid formed by the three strands or filaments.

By the ribs radially projecting from the external covering made of plastic material, the draw tape of the present invention has a substantially lower friction as compared to conventional prior art draw tapes.

When the section of the external covering of plastic material of the rope composing the elongated flexible element of the draw tape follows the helical arrangement of the winding of the strands the rope is composed of or when it is provided with external ribs the draw tape has a limited number of contact points or areas with the walls of a duct for installing the cables and/or with other cables or objects present in said duct.

The provision of a helical external surface of the rope composing the flexible element of the draw tape allows also a kind of screwing effect to be generated during the axial forward movement, which effect is obtained by rotating the rope about its own longitudinal axis, the helical arrangement operating as a threading.

Moreover in this manner by using a rope of the type according to the present invention as the elongated flexible element of a draw tape it is possible to obtain a draw tape that can exert greater pushing and pulling forces when passing into tubes or ducts for installation of cables.

An advantageous embodiment of the rope of this invention also provides strands or filaments having different diameters, which may be advantageously selected from equal or different materials, depending on the use for which the draw tape is designed, which actually allows it to be used in a number of fields or applications.

Furthermore, said strands or filaments are preferably made of stainless steel, whereas the jacket of said rope is made of plastic. This provides the advantage of using substantially inexpensive materials, such as plastic, instead of Teflon for the rope jacket. Nevertheless, Teflon may be still used as a jacket, thereby providing added smoothness to the rope of the present invention, as compared with prior art ropes.

When a hammered or not hammered covering jacket is provided it is preferably made of metal material that for example can be steel or the like.

In combination with one or more of the preceding characteristics, the draw tape can have a front tip or end fastened to the front end of the helical rope and an end removably coupling the cables or other types of elastic elements to be installed in tubes or ducts.

Different shapes can be provided for the rear tip and end and such elements can be both separate constructional parts coupled to the corresponding ends of the rope or can be composed of filaments or strands of the rope itself that are shaped in their end portions such to form said front end and/or rear end without interruption with the rope part both as regards the shape and as regards the fact that said ends can be therefore formed as one piece.

Still according to a characteristic, even said ends can be covered partially or completely by the same covering of the rope part.

The present invention relates also to the process for manufacturing a draw tape with an elongated flexible element composed of a multifilament rope according to what described above.

Said process providing the following steps:

Providing three strands, particularly but not exclusively made of metal material, preferably steel;

winding the strands in a helical arrangement around a common longitudinal axis;

hammering the helically wound strands according to two or more directions perpendicular to the longitudinal axis by hammering sectors shaped like a sector of a circumference until the average diameter of the rope after hammering is reduced to a diameter smaller than the average diameter of the rope before hammering;

coating the rope so obtained by a covering layer.

Hammering is carried out at two or more than two, preferably more than four concave surfaces composing a sector of a circle acting in radial direction; after hammering, the strands or filaments are squeezed against each other substantially at the contact areas or near the latter.

Further steps of the manufacturing process can be fastening a front tip or end of the draw tape to the end of the rope and/or fastening a rear end to the rear end of the rope.

Such ends can be made of metal material and can have hollow seats fitting end portions of the rope which are secured against said end portions by locking them inside the seats.

As an alternative for one or both the ends of the rope element the process provides to shape end portions of the filaments or strands forming the rope such to form a front tip or end element or a rear end element.

Further characteristics and improvements are the subject matter of the claims.

BRIEF DESCRIPTION OF THE DRAWINGS

Characteristics of the invention and advantages deriving therefrom will be more clear from the following detailed description of annexed drawings, wherein:

FIGS. 11 and 12 are still a variant embodiment not providing a multifilament rope, but providing a rounded section elongated core that can also be made of non-metal material, such as plastic material or the like.

DETAILED DESCRIPTION OF EMBODIMENTS OF THE INVENTION

The draw tape for cables according to the present invention, as all the draw tapes for cables, comprises an elongated flexible element intended for being inserted in the cable duct or in a passage, a tube, a sheath or the like and at the rear end thereof with reference to the insertion direction, the cable or cables or any other elongated flexible elements are removably attached which are intended to be inserted in the cable duct, tube, or sheath provided for their installation.

The elongated flexible element of the draw tape for cables according to the present invention is composed of a multifilament rope comprising three helically wound filaments or strands.

The rope composing the flexible element of the draw tape for cables according to the present invention is produced by winding three filaments or strands 101, 102, 103 that compose the rope 1 with a helical shape around a common longitudinal axis denoted by A. Then the rope, that is the three helically wound strands or filaments 101, 102, 103 is hammered according to two or more directions perpendicular to the longitudinal axis A and then said assembly is covered by a jacket 2.

Figure 5:
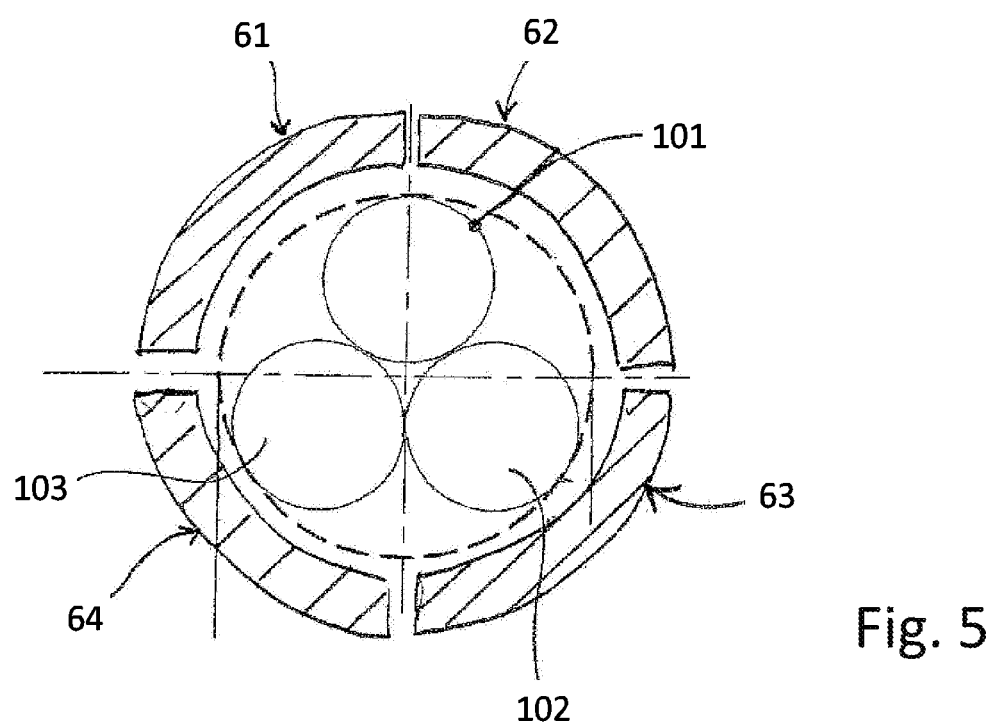
FIG. 5 is the hammering areas for producing a rope according to the present invention.

Particularly according to a preferred manufacturing process shown in FIG. 5 it provides the strands 101, 102, 103 in their helically wound condition, to be hammered according to four directions perpendicular to the longitudinal axis at hammering sectors 61, 62, 63, 64 having the shape of sectors of a circumference that cover 90°, until the average diameter of the assembly of helically wound strands 101, 102, 103 after hammering is reduced to the final diameter of the rope. The final diameter of the rope after peripheral hammering process is reduced to a diameter equal about to 80% to 99.9% of the average diameter of the rope before the hammering process.

In particular it is possible to provide said diameter reduction due to the hammering action to be such to bring the average diameter of the rope after the hammering process to a diameter ranging from 85% to 95% of the average diameter of the rope before the hammering process. In a preferred embodiment the diameter reduction is such to bring the average diameter of the rope after the hammering to a diameter equal about to 92% of the average diameter of the rope before the hammering process.

The application of the outer jacket, in a particular embodiment made of plastic material, is carried out, according to a preferred process, by passing the rope into an extruder, supplied with plastic material and/or Teflon. Thus the three filaments or strands 101, 102, 103 are covered by the jacket 2.

Figure 1:
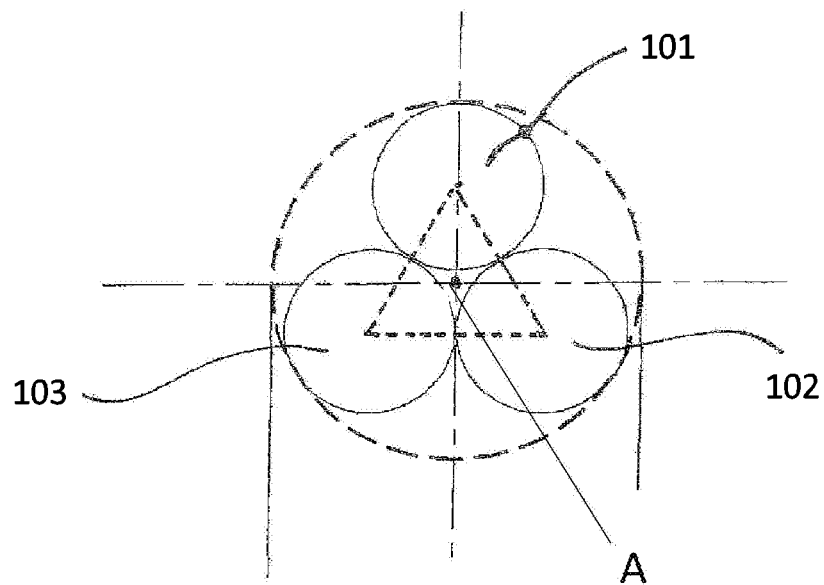
FIG. 1 is the section of the strands of the rope forming the flexible element of the draw tape according to the present invention before hammering.
Figure 2:
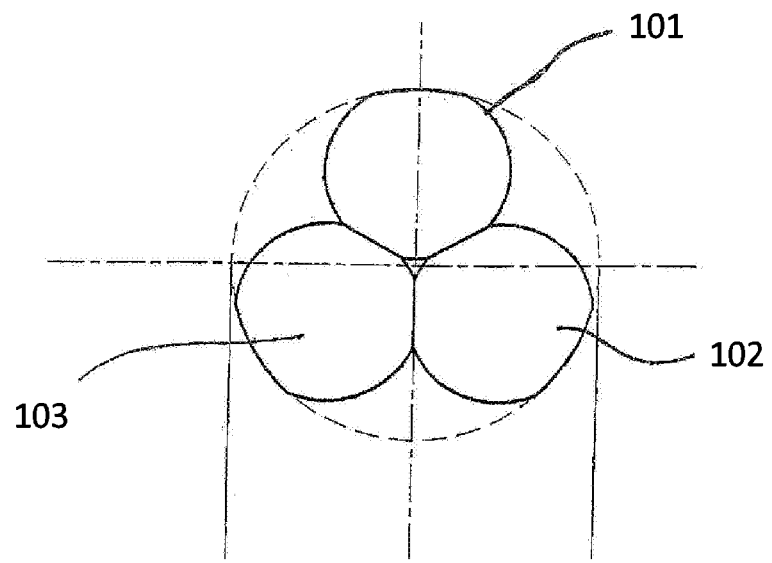
FIG. 2 is the section of the strands of the rope forming the flexible element of the draw tape according to the present invention after hammering.

It has to be noted how, due to the hammering effect, the section of the strands is flattened, passing substantially from a section shown in FIG. 1 where the strands 101, 102, 103 are simply side by side with each other to a section as in FIG. 2 where the three strands have contact lines and are flattened, both along the external edges and along the contact edges.

Generally the hammering process occurs by two or more concave surfaces forming a sector of a circle acting in a radial direction and which surfaces complete with one another such to form a substantially circular surface.

Figure 3:
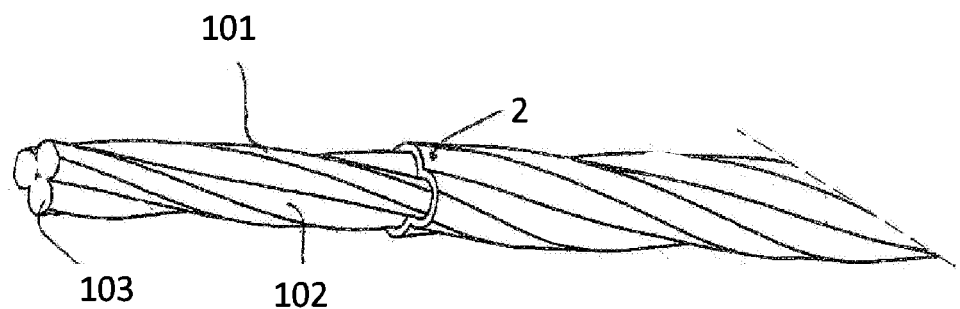
FIG. 3 is a perspective view of the rope according to the present invention and of the covering.
Figure 4:
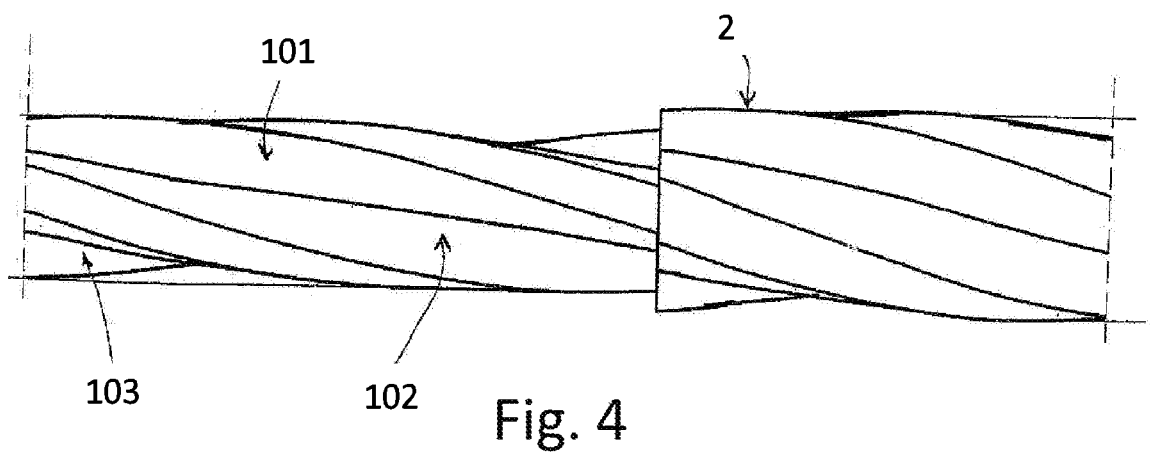
FIG. 4 is a plan view of the rope according to the present invention and of the covering.

Then due to the application of the plastic material and/or Teflon the three filaments or strands 101, 102, 103 are covered by the jacket 2 such as shown in FIGS. 3 and 4.

The figures show a preferred embodiment, where said filaments or strands are three and have the same diameter and are helically wound to form said rope, however the diameters of the strands can be all different from one another or only one strand can have a diameter different from the diameters of the other two strands that on the contrary are identical to each other.

In FIG. 1 it is possible to note that the respective centers of the circumferences of the filaments or strands 101, 102, 103 are at the vertices of an equilateral triangle shown by dashed line, the center of gravity of such equilateral triangle corresponding to the longitudinal winding axis of the helicoid composed of the three filaments or strands.

As regards the front and rear ends, not shown, they can be composed as in known draw tapes of separate constructional parts fastened to one of the two ends of the rope 1.

Such ends can be coupled by mechanically securing deformable seats against end portions of the rope and/or can be also covered by the material of the jacket 2 at least partially or completely.

A variant embodiment that can be provided as an alternative or in combination for making only one of the two ends or both said ends provides them to be formed as one piece with the rope by shaping the end portions of the strands forming the rope.

Also in this case the ends can be at least partially covered by the jacket 2.

Figure 6:
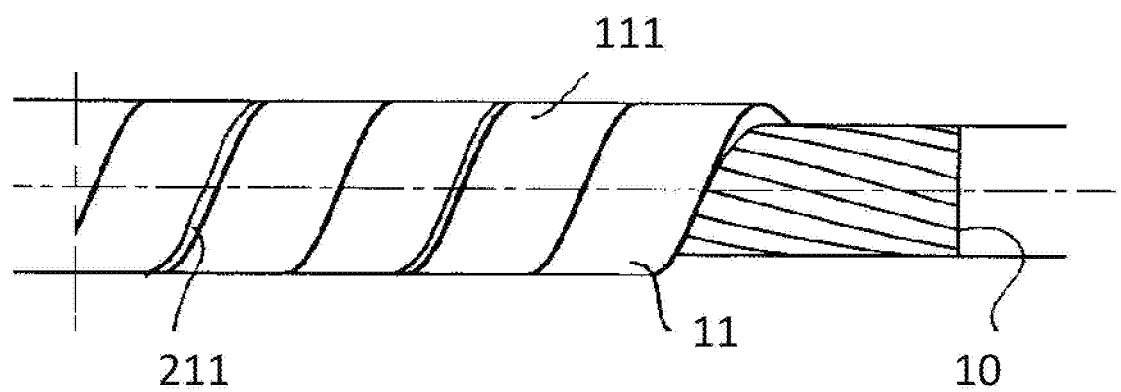
FIGS. 6 to 8 are a further variant embodiment where the multifilament rope has seven strands and further a hammered armor external jacket.
Figure 7:
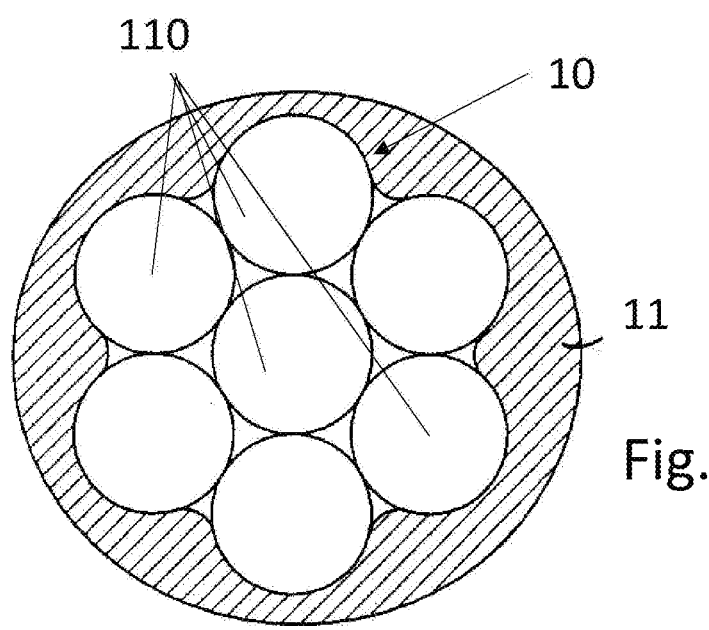
Figure 8:
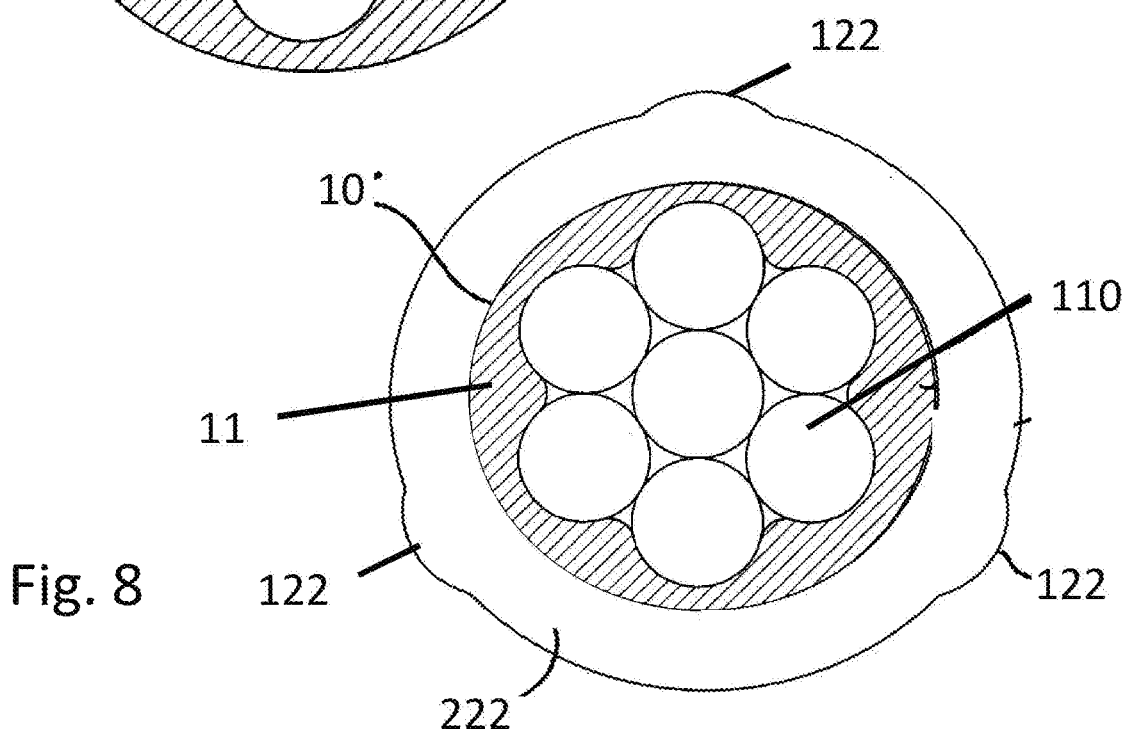

With reference to the embodiment of FIGS. 6 to 8, the elongated flexible element of a draw tape is composed of a multifilament rope 10 comprising seven strands 110 the peripheral strands are helically wound about the central strand. The external surface of the multifilament rope 10 is wound in an armor jacket 11 composed of at least one strip of material, preferably metal material, such as for example steel, which strip has a predetermined thickness and a predetermined width and it is helically wound along the external surface of the rope 10. Moreover in the shown embodiment in order to seal possible slots 211 the strip 111 is further hammered for example by a technique and by devices similar to those of FIG. 5.

The hammering of the armor jacket provides to improve the mechanical characteristics of the cable; however it is not an essentially necessary step for a solution having satisfying characteristics even if not the best characteristics.

A process for making an armored cable is known from the patent application SV2005A000022.

On the hammered or eventually not hammered armor layer 11 an outer covering layer 22 of plastic material is applied preferably by extrusion or even by injection molding, similar to that denoted by 2 in the previous example which however has along the perimeter of the cross section, essentially circular one, a plurality of longitudinal ribs 122. They can be spaced from each other according to various different or identical sizes and can have a rectilinear arrangement, that is parallel to the axis of the rope 10 or can be helically wound about the longitudinal central axis of the rope 10.

Figure 9:
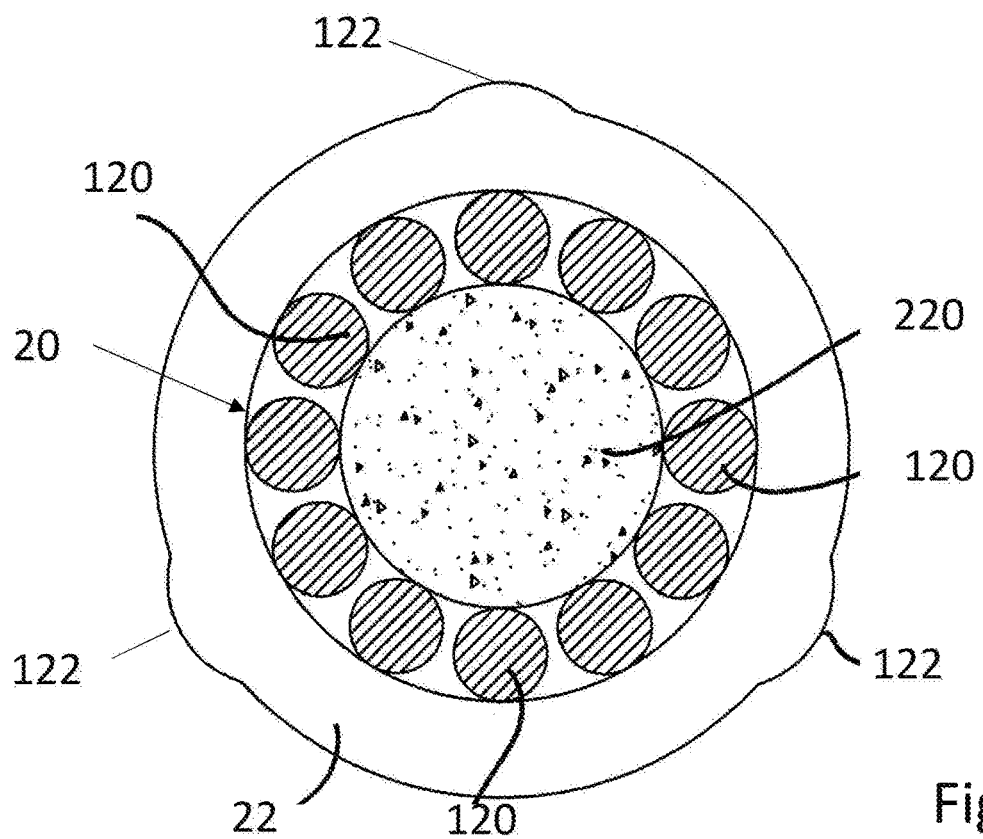
FIGS. 9 and 10 are two further variant embodiments where the rope is provided with several strands and the external covering made of plastic material is directly applied on the helically wound strands.

The embodiment of FIG. 9 is different from the one of FIGS. 6 to 8, in the fact that the rope has a central core which is not composed of filaments or strands, but of a core with a substantially cylindrical section, made even of a non-metal material, as plastic material or the like. This core 220 is wound by filaments or strands, preferably metal ones 120 that are helically wound about said core 220.

The external jacket 22 also in this case is similar to that of the embodiment according to FIGS. 6 to 8.

Likewise the example of FIGS. 6 to 8 it is possible to provide also in this case of the variant of FIG. 9 an armor covering that would cover the assembly of strands 1220 winding the core 220.

Figure 10:
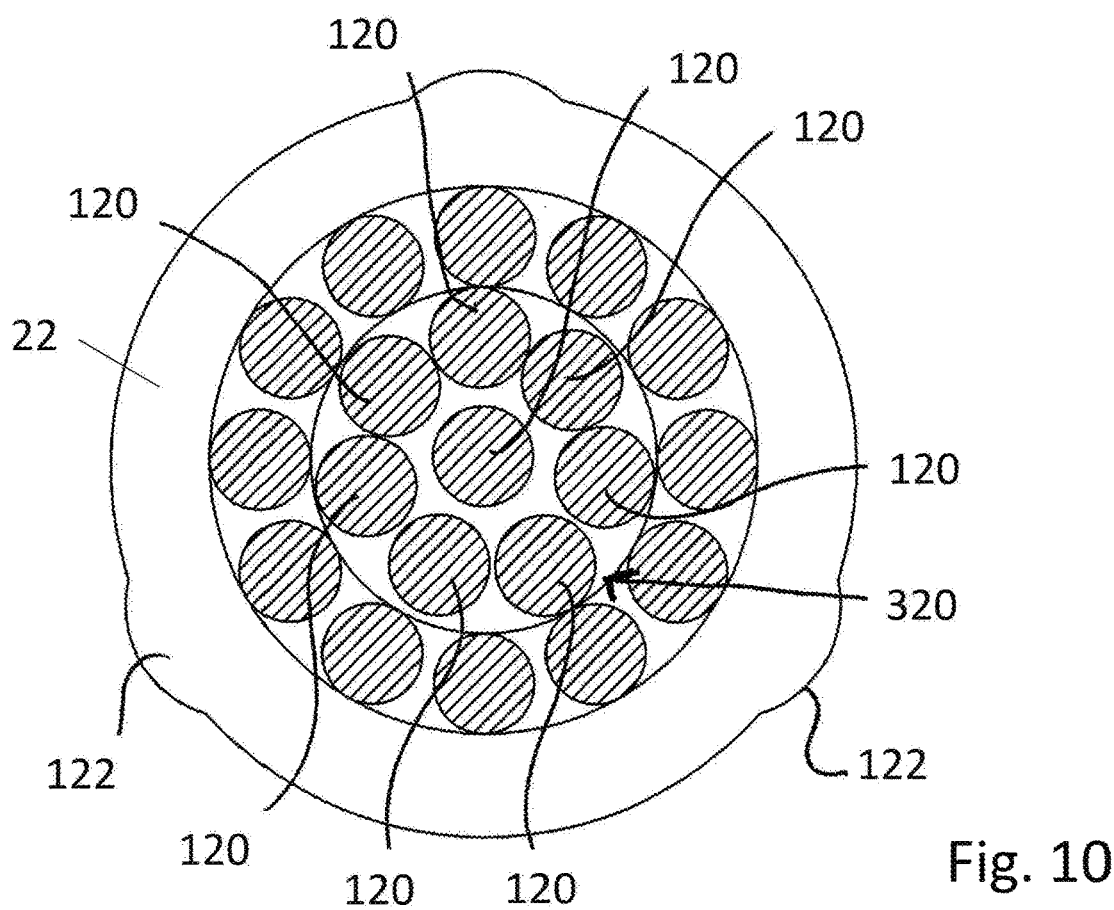

The example of FIG. 10 is similar to the example of FIGS. 1 to 5. The rope has a high number of strands 120, the jacket 22 is directly applied about the multifilament rope 20 and it is similar to that of the example of FIG. 10.

Figure 11:
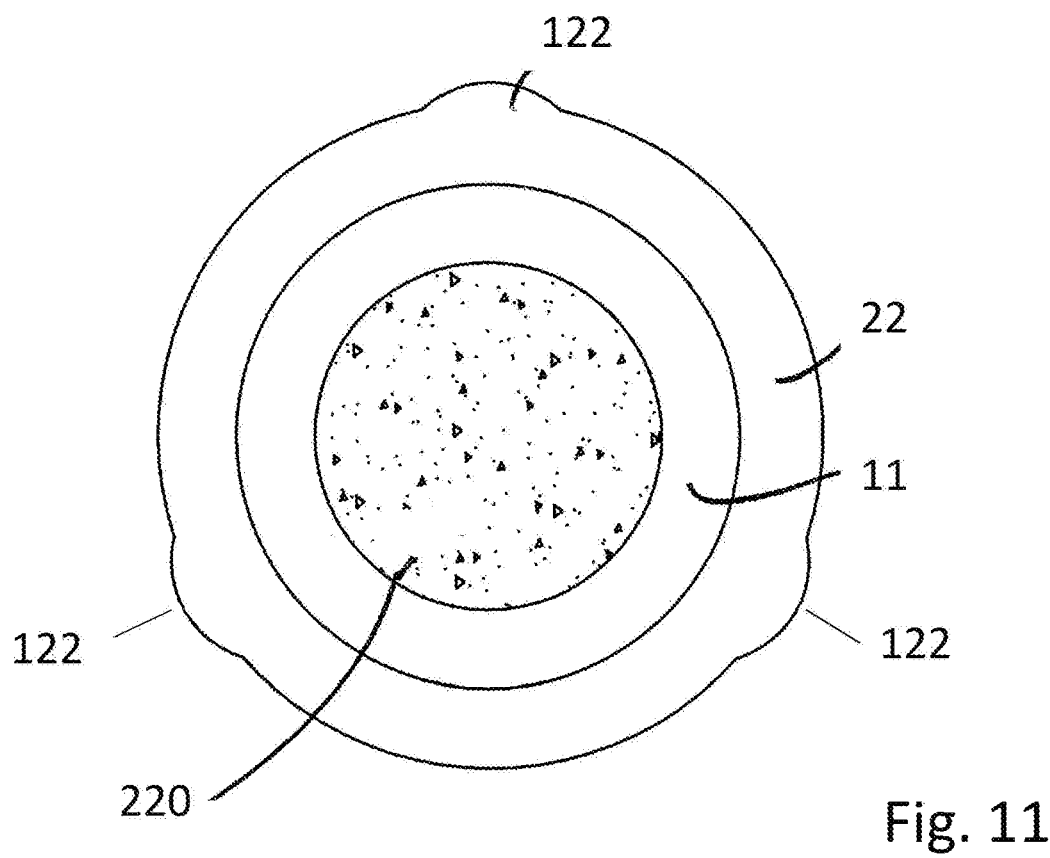
Figure 12:
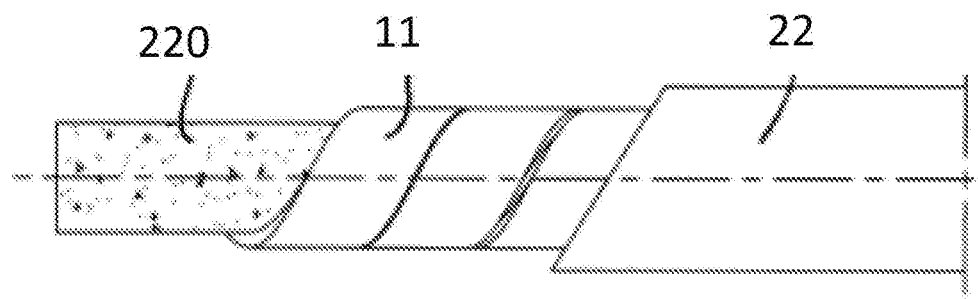

FIGS. 11 and 12 show still a variant embodiment, where the multifilament rope always present in the previous embodiments is completely replaced by a flexible longitudinal element 220 made of non-metal material wound by a armor jacket 11 that can be hammered or not and that in turn is covered by an external jacket 22 completely identical to that of the examples of previous FIGS. 9 to 10.

From the above it is clear how the different combinations of characteristics of the shown examples can be interchangeable such to optimize the shape and mechanical characteristics of the flexible elongated element of the draw tape.

As regards the ends, they can be made and applied according to one or more of the characteristics described with reference to the embodiment of FIGS. 1 to 5.

The invention claimed is:

1. A draw tape for cables or for elongated flexible elements, comprising:
    an elongated flexible element portion made of a helical multifilament rope composed of at least three filaments or strands helically wound about a common longitudinal axis;
    a jacket wrapping the helical multifilament rope; and
    an external covering layer made of a plastic material that is attached to an entirety of an outer surface of the jacket,
    wherein the external covering layer has one or more radial external webs or ribs arranged along a circumference of a section of said external covering layer and oriented parallel to a longitudinal axis of the draw tape or with a helical arrangement about the longitudinal axis of the draw tape.

2. The draw tape according to claim 1, wherein the multifilament rope has four or more strands or filaments.

3. The draw tape according to claim 1, wherein the multifilament rope has a longitudinal core element, about which the strands or filaments are wound.

4. The draw tape according to claim 1, wherein the rope having the at least three helically wound filaments or strands has hammered surfaces, whereby the strands have contact lines and are flattened, both along external edges and along contact edges.

5. The draw tape according to claim 4, wherein an average diameter of the rope after hammering ranges from 80% to 99.9% of an outer diameter of the rope before the hammering.

6. The draw tape according claim 1, wherein the multifilament rope is provided as an armored cable.

7. The draw tape according to claim 6, wherein said rope provided as an armored cable is composed of helically wound strands or filaments and is covered on an outside by a cylindrical jacket or by an armor coating.

8. The draw tape according to claim 7, wherein the helically wound strands or filaments or a material forming the cylindrical jacket or a covering layer are hammered on directly their external peripheral surface toward a center of the rope.

9. The draw tape according to claim 1, further comprising an armor coating interposed between the jacket and the external covering layer, the external covering layer entirely covering an outer surface of the armor coating.

10. The draw tape according to claim 9, wherein the armor coating comprises a plurality of filaments disposed on the jacket.

11. The draw tape according to claim 1, wherein said rope has filaments or strands having a same diameter.

12. The draw tape according to claim 1, wherein the draw tape has three helically wound filaments or strands and respective centers of circumferences of the filaments or strands are, in cross-section, at vertices of an equilateral triangle, a center of gravity of said equilateral triangle corresponding to a longitudinal winding axis of a helicoid composed of the three filaments or strands.

13. The draw tape according to claim 1, wherein at least one of the strands or filaments has a diameter different than the diameter of the remaining two strands or filaments.

14. The draw tape according to claim 1, wherein the rope is composed of metal filaments or strands made of steel.

15. A process of manufacturing a draw tape comprising:
    providing at least three strands;
    winding the at least three strands in a helical arrangement about a common longitudinal axis;
    hammering the three helically wound strands according to two or preferably more than two directions perpendicular to the common longitudinal axis;
    externally covering the rope with a jacket;
    attaching an external covering layer made of a plastic material to an entirety of an outer surface of the jacket, the external covering layer having one or more radial external webs or ribs arranged along a circumference of a section of said external covering layer and oriented parallel to a longitudinal axis of the draw tape or with a helical arrangement about the longitudinal axis of the draw tape.

16. The process according to claim 15, further comprising the step of:
    hammering the rope according to at least four directions perpendicular to the common longitudinal axis by hammering sectors shaped as a circumference sector till reducing an average diameter of the rope after the hammering to a diameter ranging from 99.9% to 80 of the average diameter of the rope before the hammering.

17. The process according to claim 15, wherein, before applying the external covering layer, an armor jacket of the multifilament rope is applied.

18. The process according to claim 15, wherein the jacket is applied by extruding a plastic material or Teflon about the rope using an extruder.

19. A method of drawing a flexible longitudinal element along a tubular passage duct, comprising:
    providing a draw tape having,
        an elongated flexible element portion made of a helical multifilament rope composed of at least three filaments or strands helically wound about a common longitudinal axis, a jacket wrapping the helical multifilament rope, and
an external covering layer made of a plastic material that entirely covers an outer surface of the jacket,
wherein the external covering layer has one or more radial external webs or ribs arranged along a circumference of a section of said external covering layer and oriented parallel to a longitudinal axis of the draw tape or with a helical arrangement about the longitudinal axis of the draw tape;
attaching the flexible longitudinal element to the draw tape; and
drawing the draw tape with the flexible longitudinal element attached thereto along the tubular passage duct.

* * * * *